US008379238B2

(12) United States Patent
Asakawa

(10) Patent No.: US 8,379,238 B2
(45) Date of Patent: Feb. 19, 2013

(54) APPARATUS FOR PREVENTING UNNECESSARY IMAGE FORMATION

(75) Inventor: Minoru Asakawa, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1231 days.

(21) Appl. No.: 11/828,816

(22) Filed: Jul. 26, 2007

(65) Prior Publication Data

US 2008/0030749 A1 Feb. 7, 2008

(30) Foreign Application Priority Data

Aug. 2, 2006 (JP) ............................ JP2006-210665

(51) Int. Cl.
*G06K 15/00* (2006.01)
*G03G 15/00* (2006.01)

(52) U.S. Cl. ....... 358/1.14; 358/1.12; 399/388; 399/391

(58) Field of Classification Search ........................ None
See application file for complete search history.

(56) References Cited

U.S. PATENT DOCUMENTS 5,153,641 A * 10/1992 Takahashi ........................ 399/86
5,734,958 A * 3/1998 Kazama et al. ................ 399/363
2005/0135860 A1* 6/2005 Van Vliembergen ......... 400/624
2005/0220475 A1* 10/2005 Kasahara ........................ 399/82

FOREIGN PATENT DOCUMENTS

JP 07-121080 5/1995
JP 11-249498 9/1999

OTHER PUBLICATIONS

Notice of Reasons for Refusal issued on Jul. 29, 2011 by Japan Patent Office in corresponding Application No. JP-2006-210665 (2 pages). English-language translation of Notice of Reasons for Refusal issued on Jul. 29, 2011 by Japan Patent Office in corresponding Application No. JP-2006-210665 (4 pages).

* cited by examiner

*Primary Examiner* — Vincent Rudolph
(74) *Attorney, Agent, or Firm* — Finnegan, Henderson, Farabow, Garrett & Dunner LLP

(57) ABSTRACT

In order to provide an image forming apparatus which controls unnecessary image formation without reducing productivity, at the time of automatic sheet selection, the number of image sheets M which can be present from the writing position of images using the image writing section to the transfer position of the transfer section and the number of sheet N which can be present from the sensors which detect the no-paper state in each of the plurality of sheet feeding sections to the transfer position of the transfer section are obtained, and then the sheet feeding section which satisfies M<N is preferentially selected.

3 Claims, 4 Drawing Sheets

APPARATUS FOR PREVENTING UNNECESSARY IMAGE FORMATION

This application is based on Japanese Patent Application No. 2006-210665 filed on Aug. 2, 2006, in Japanese Patent Office, the entire content of which is hereby incorporated by reference.

TECHNICAL FIELD

The present invention relates to an image forming apparatus such as a copier, a printer, a facsimile or the like.

BACKGROUND OF THE INVENTION

In an electro-photographic type image forming apparatus where the distance from position for writing the image onto the photoreceptor to the position for transfer of the image to a sheet is long (this distance is long especially in the color tandem type image forming apparatus using intermediate transfer member), sometimes the image is already being formed on the photoreceptor or the intermediate transfer member at the point when it is detected that there are no more sheets in the sheet feeding tray.

In this case, because the image that was formed cannot be transferred to the sheet, the untransferred toner on the photoreceptor or the intermediate transfer member needs to be cleaned using a cleaning blade or the like. This causes cleaning off a great deal of untransferred toner, thus resulting in faster deterioration of the photoreceptor, intermediate transfer member and cleaning blade. In addition, this causes excess toner to be consumed.

In order to solve the foregoing problems, the Patent Document 1 describes that the sheet feeding interval and the image interval are lengthened and the writing starting point is delayed behind the sheet feeding starting point so as to avoid unnecessary image formation in the case where the number of remaining sheets in the feeding tray becomes small.

Patent Document 1: Unexamined Japanese Patent Application Publication No. 2001-337575.

However, in the method described in the Patent Document 1, the sheet feeding interval is lengthened when the number of sheets remaining in the sheet feeding tray becomes low and thus productivity is reduced.

The present invention was conceived in view of the foregoing problems and an object thereof is to provide an image forming apparatus that controls unnecessary image formation without reducing productivity.

SUMMARY

One aspect of the present invention is an image forming apparatus comprising: an image carrier; an image writing section for writing an image on the image carrier based on image data; a development section for developing the image written by the image writing section; a transfer section which transfers the image developed by the development section to a sheet; a plurality of sheet feeding sections each of which includes a sensor for detecting absence of sheet and feeds sheets to the transfer section; an input section for setting an automatic sheet selection mode that selects one sheet feeding section which stores sheets of a size corresponding to a size of the image from the plurality of sheet feeding sections; and a control section for obtaining a number of images M which can be present from the position for writing of an image by the image writing section to a transfer position of the transfer section, and a plurality of numbers of sheets N which can be present from the sensors in each of the plurality of sheet feeding section to the transfer position of the transfer section in the case where the setting for automatic sheet feeding selection is input by the input section, and for preferentially selecting one of the sheet feeding sections which satisfies $M<N$.

An image forming apparatus according to the present invention is designed in such a way to select a sheet feeding section that is known to show the presence or absence of image-formed sheets used in writing the image when performing automatic sheet selection, and thus unnecessary image formation can be controlled without reducing productivity.

DESCRIPTION OF THE PREFERRED EMBODIMENT

The present invention will be described based on this embodiment with reference to the drawings, but the present invention is not to be limited by this embodiment.

(Apparatus Structure)

Figure 1:
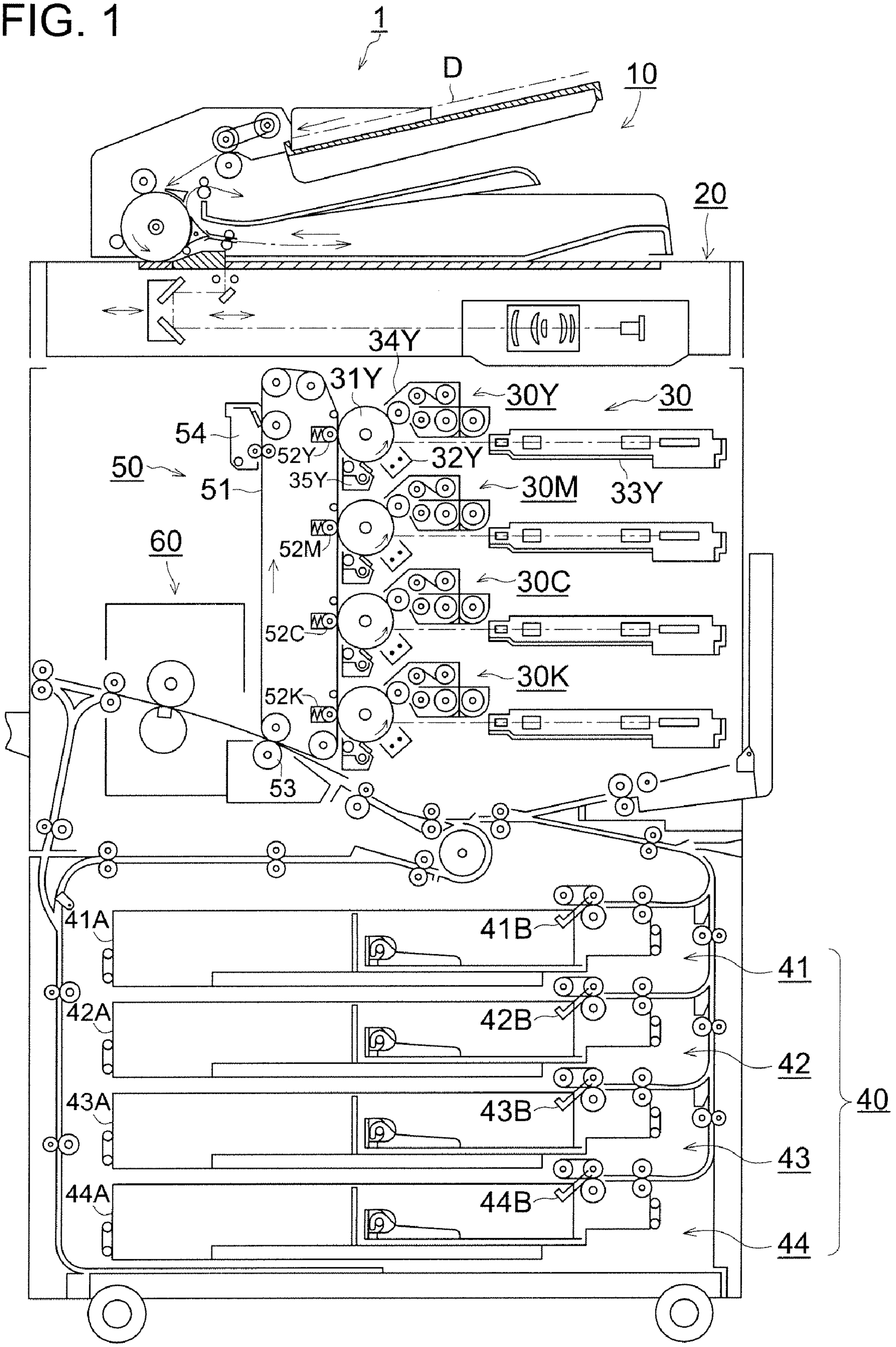
FIG. 1 is a structural view of the image forming apparatus of this embodiment.

FIG. 1 is a structural view of the image forming apparatus of this embodiment. The image forming apparatus 1 comprises a document conveyance section 10, an image reading section 20, an image forming section 30, a sheet feeding section 40, a transfer section 50, a fixing section 60 and other sections.

The document conveyance section 10 conveys the stacked documents D one sheet at a time in the direction of the image reading section 20.

The image reading section 20 reads the images on the document D that has been conveyed by the document conveyance section 10 and outputs the image data.

The image forming section 30 comprises image forming sections of four colors which are 30Y, 30M, 30C and 30K, and performs full color image formation. The image forming section 30Y comprises a charger 32Y in the vicinity of the photoreceptor 31Y as the image carrier, an exposure device 33Y as the image writing section; a developer 34Y as the development section, and a cleaning device 35Y. The surface of the photoreceptor 31 is charged by the charger 32Y and then exposed by the exposure device 33Y based on the image data output from the image reading section 20, and then developed by the developer 34Y to thereby form a toner image on the surface of the photoreceptor 31Y. The toner image is transferred to the sheet by the transfer section 50. Residual toner on the surface of the photoreceptor 31Y after having been transferred is cleaned off by the cleaning device 35Y. The image forming sections 30M, 30C and 30K operate in the same manner.

The sheet feeding section 40 comprises four sheet feeding sections 41, 42, 43 and 44 which feed sheets toward the transfer section 50. The sheet feeding sections 41, 42, 43 and

44 respectively comprise sheet feeding trays 41A, 42A, 43A and 44A and no-sheet detection sensors 41B, 42B, 43B and 44B.

The transfer section 50 transfers the toner image carried on the surface of the photoreceptor 31 of the image forming section 30 to the sheet that has been fed from the sheet feeding section 40. The transfer section 50 comprises the intermediate transfer belt 51 as the intermediate transfer member, the primary transfer rollers 52Y, 52M, 52C and 52K, the secondary transfer roller 53 as the second transfer section, and the cleaning device 54 and the like. The toner images carried on the surface of the photoreceptors 31Y, 31M, 31C and 31K are primarily transferred to the intermediate transfer belt 51 by the primary transfer rollers 52Y, 52M, 52C and 52K, and then transferred to the sheet by the secondary roller 53.

The fixing section 60 applies heat and pressure to the sheet with toner images formed thereon that have been conveyed from the transfer section 50 for the purpose of fixing the sheet. The sheet that has been fixed is ejected outside the apparatus.

(Control Structure)

Figure 2:
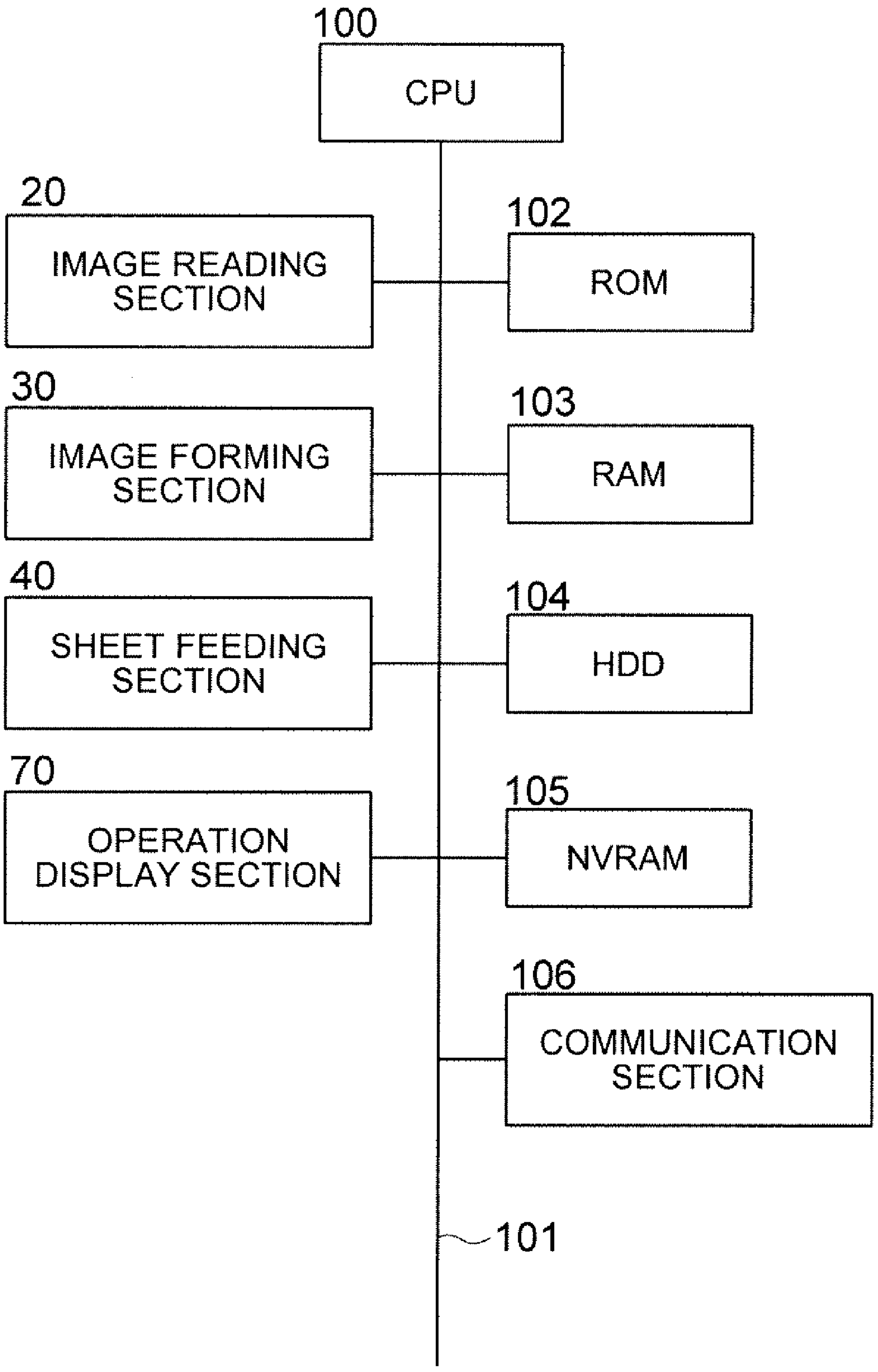
FIG. 2 is a view of the control structure of the image forming apparatus of this embodiment.

FIG. 2 is a view of the control structure of the image forming apparatus of this embodiment. Control items that are not directly related to the present invention have been omitted.

The image forming apparatus 1 has some components centered at a CPU 100 that serves as a control section to perform various control operations thereof, according to programs, ROM 102, RAM 103, HDD 104, NVRAM 105, image reading section 20, image forming section 30, sheet feeding section 40, the operation display section 70 as the input section, and communication section 106 and the like that are connected to each other via the bus 101.

The ROM 102 stores various programs and data, and the CPU 100 uses these programs and data to control the image forming apparatus 1.

The RAM 103 is used as a work area by the CPU 100, and temporarily stores programs and data required when the CPU 100 performs control.

The HDD 104 stores image data input from the image reading section 20 or image data input from external devices such as a personal computer or the like via the communication section 106.

The NVRAM 105 stores various settings registered by the user or customer service personnel.

The image forming section 30 forms an image on a sheet fed from the sheet feeding section 40 based on image data input from the image reading section 20 or image data input from the external devices such as a personal computer or the like via a communication device 106.

The operation display section 70 comprises a touch panel and the like and displays various operation screens and inputs various commands. The operation display section 70 of this embodiment sets the automatic sheet selection mode that among four sheet feeding sections 40, automatically selects a sheet feeding section for which sheet size is set to the new size that is determined by the size and magnification of the document.

The communication section 106 is connected to an external network and image data, and condition setting data are input from a personal computer or the like. When image data is input via the communication section 106, the settings for automatic sheet selection are also input via the communications section 106. In this case, the communication section 106 is equivalent to the input section.

(Control Outline)

Figure 3:
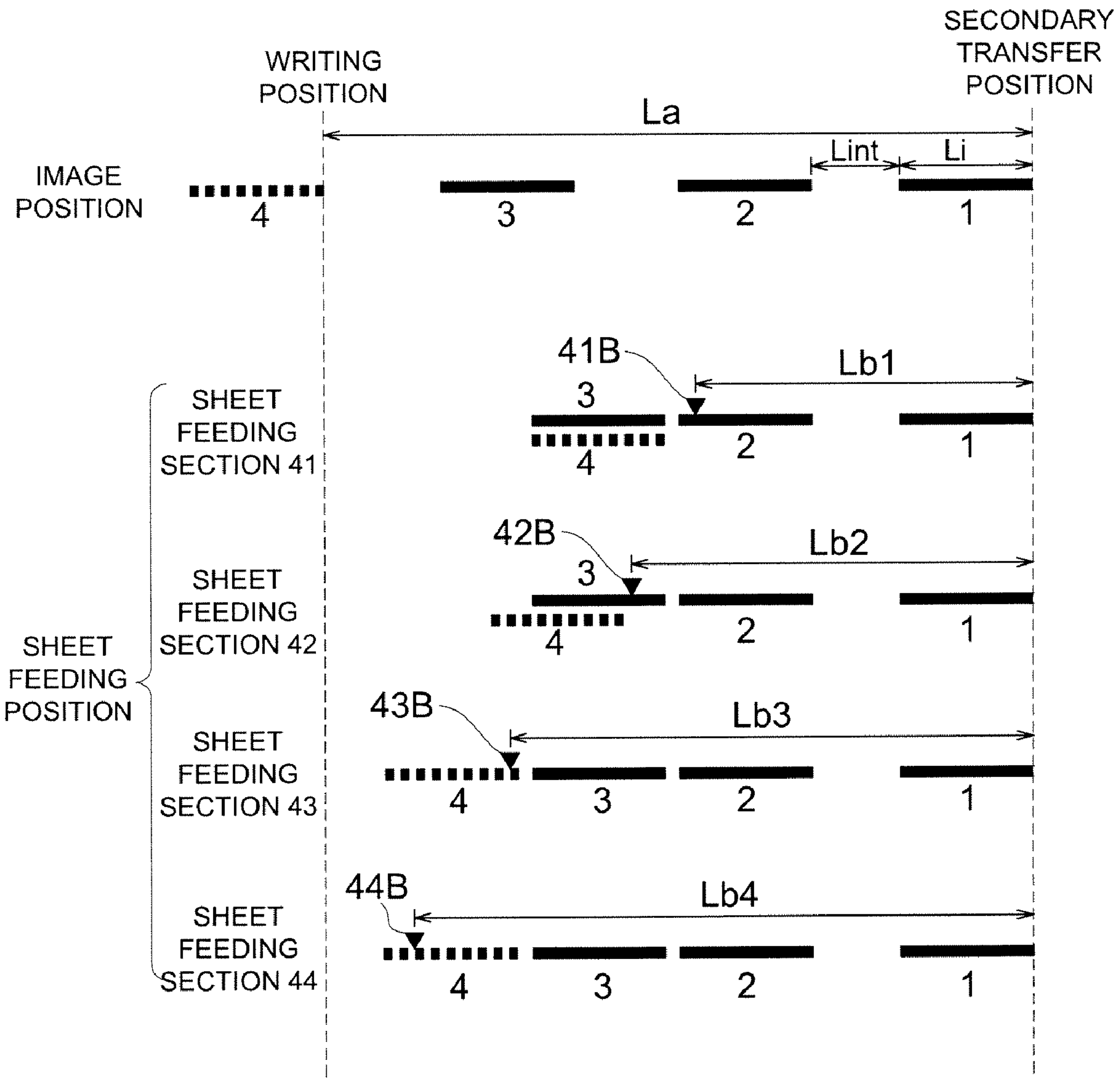
FIG. 3 is a schematic view showing one example of the image position at the time of continuous image formation and the sheet feeding positions when the sheets are fed from each of the sheet feeding sections.

FIG. 3 is a schematic view showing one example of the image positions at the time of continuous image formation and the sheet feeding positions when the sheets are fed from each of the sheet feeding sections. For ease of understanding, the point where the front end of the first image and the front end of the first sheet reach the secondary transfer position (position of the secondary transfer roller 53) is shown.

First, the image position will be described. The distance from the image writing position to the secondary transfer position is La. The image writing position herein is the exposure and radiation position on the photoreceptor 31Y in the image formation section 30Y which is the furthest from the secondary transfer roller 53. This is because in order to control unnecessary image formation, it is necessary to consider the location where image writing is carried out at the earliest time.

The front end of the first image is positioned at the secondary transfer position, and the second image and the third image follow as the image writing position is approached. There exist three images within the range of La. The image length in the conveyance direction is shown by Li, and the interval between one image and another is shown by Lint. The fourth image is on the point of beginning image writing.

Next, description will be made for the sheet feed positions where sheets have been fed from the sheet feeding sections corresponding to these image positions. The distances from the sensors 41B, 42B, 43B and 44B which detect the no-sheet state in the sheet feeding sections 41, 42, 43 and 44 to the secondary transfer position are Lb1, Lb2, Lb3 and Lb4 respectively and $Lb1<Lb2<Lb3<Lb4$.

When sheet is fed from sheet feeding section 41, up to the second sheet can be present within Lb1. That is to say, the presence or absence of sheets is detected for up to the second sheet, and for the third sheet and after, presence or absence of sheets is unknown. In this case, even if there was no fourth sheet, the no-paper state for the fourth sheet still has not been detected and thus image writing for the fourth sheet begins and unnecessary image formation is performed.

When a sheet is fed from sheet feeding section 42, up to the third sheet can be present within Lb1. That is to say, the presence or absence of sheets is detected for up to the third sheet, and for the fourth sheet and after, presence or absence of sheets is unknown. In this case, even if there was no fourth sheet, the no-paper state for the fourth sheet still has not been detected, and thus image writing for the fourth sheet begins and unnecessary image formation is performed.

When a sheet is fed from sheet feeding section 43, up to the fourth sheet can be present within Lb1. That is to say, the presence or absence of sheets is detected for up to the fourth sheet. In this case, when there is no fourth sheet, the no-paper state for the fourth sheet is detected, and thus image writing for the fourth sheet can be stopped and unnecessary image formation is not performed.

When a sheet is fed from sheet feeding section 44, up to the fourth sheet can be present within Lb1. That is to say, the presence or absence of sheets is detected for up to the fourth sheet. In this case, when there is no fourth sheet, the no-paper state for the fourth sheet is detected, and thus image writing for the fourth sheet can be stopped and unnecessary image formation is not performed.

In this type of situation, in the case where automatic sheet selection is carried out, the sheet feeding section 43 or the sheet feeding section 44 in which unnecessary image formation is not performed can be preferentially selected. It is more preferable to preferentially select the sheet feeding section 43 which has the shorter distance up to the secondary transfer position of the sheet feeding section 43 or the sheet feeding section 44. This is because the time from the start of printing to when the first sheet is ejected (first copy time) is reduced, productivity is improved and in addition the length of the conveyance path up to the secondary transfer position is shortened and the rate of occurrence of jams is reduced.

The above relationships described in FIG. 3 are summarized in Table 1. It is to be noted that in all the sheet feeding sections, the sheet sizes to be selected based on document size and magnification are set.

TABLE 1

| Sheet feeding section | M | N | Relationship between M and N | Lb | Priority ranking for automatic sheet selection |
|---|---|---|---|---|---|
| Sheet feeding section 41 | 3 | 2 | M > N | Lb1 | 3 |
| Sheet feeding section 42 | 3 | 3 | M = N | Lb2 | 4 |
| Sheet feeding section 43 | 3 | 4 | M < N | Lb3 | 1 |
| Sheet feeding section 44 | 3 | 4 | M < N | Lb4 | 2 |

M herein indicates the number of images that can be present from the writing position to the secondary transfer position, while N indicates the number of sheets which can be present from the "no-sheet" detection sensors 41B, 42B, 43B and 44B of the sheet feeding sections 41, 42, 43 and 44 to the secondary transfer position. In addition, Lb indicates the distance from the "no-sheet" detection sensors to the secondary transfer position, and Lb1<Lb2<Lb3<Lb4 herein.

In M<N, as described above, unnecessary image formation is never performed. For this reason, the priority ranking of the sheet feeding section 43 and the sheet feeding section 44 is high in automatic sheet selection. Furthermore, the priority ranking is higher for the sheet feeding section with a shorter Lb, and thus the priority ranking for the sheet feeding section 43 is highest. As a result, as shown in Table 1, the priority rankings are in the order sheet feeding section 43, sheet feeding section 44, sheet feeding section 41, sheet feeding section 42. As a result, in automatic sheet selection of this embodiment, sheet feeding section 43 is most preferentially selected.

This type of control is particularly effective in the tandem type full color image forming apparatus which has an intermediate transfer member and in which the distance from the writing position to the transfer position is long, as is the case in this embodiment.

(Control Flow)

Figure 4:
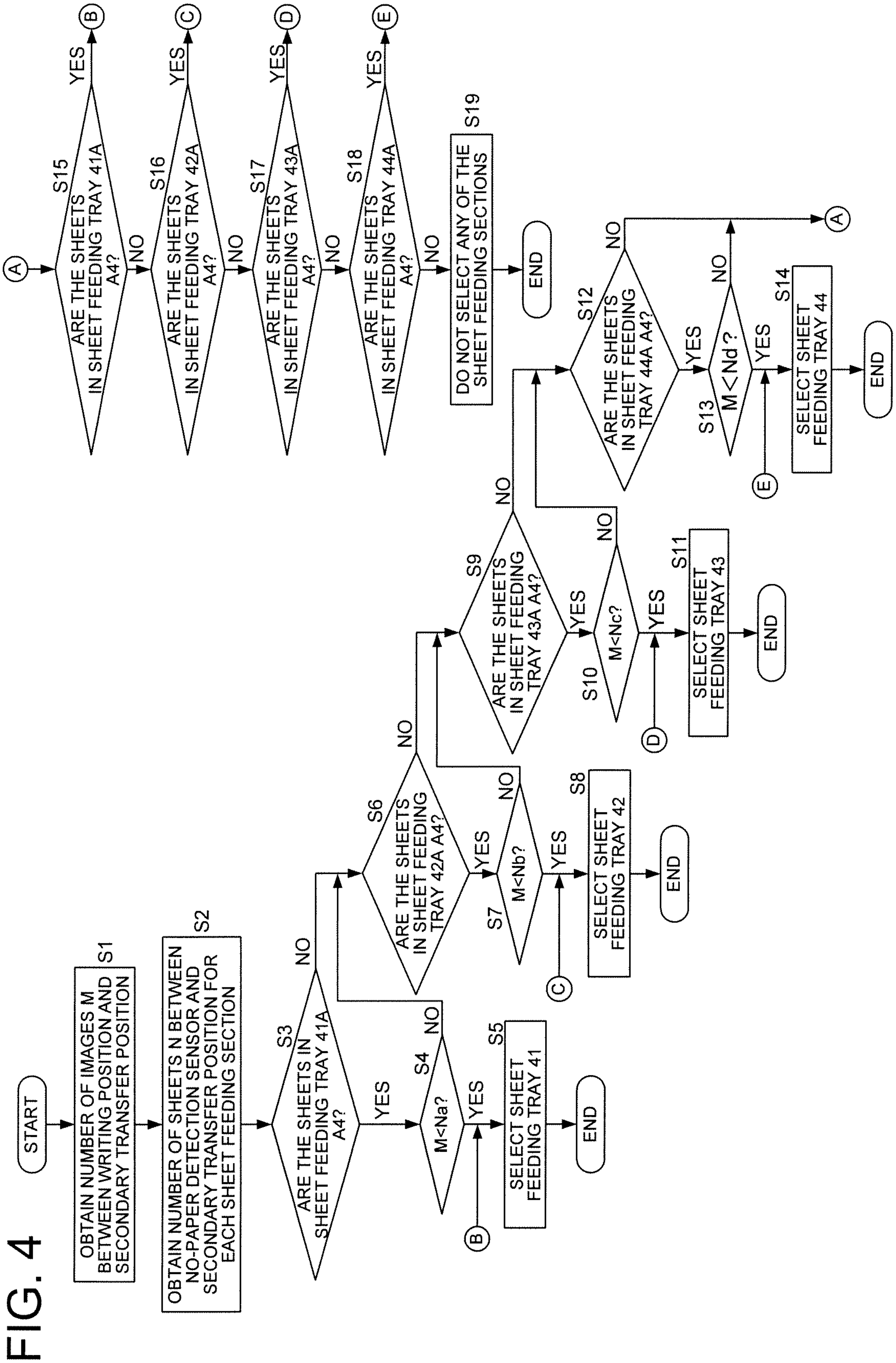
FIG. 4 is a control flow chart of the automatic sheet selection process of this embodiment.

FIG. 4 is a control flow chart of the automatic sheet selection process of this embodiment. The automatic sheet selection process is carried out based on a program stored in the ROM 102 by the CPU 100 which is the control section. It is to be noted that automatic sheet selection is set by the control display section 70, and for easy comprehension, the selected sheet size is A4, for example. Needless to say, other sizes can be suitably used as a matter of course.

First the CPU 100 obtains M which is the number of images that can be present from the writing position to the secondary transfer position (Step S1). The number of images M, as shown in FIG. 3, is calculated by performing the calculation of La/(Li+Lint) and rounding up the figures after the decimal point. Li is set by the document size and magnification. Lint is stored in advance in the ROM 102. The value M was obtained by calculation above, but the value M in relation to Li and Lint may be stored in ROM 102 in tabular form and the value M may be read directly from the ROM 102. Lint is not a fixed value and in the case where it changes depending on the mode (for example, Lint is increased in the post processing mode), the table becomes complex and it is preferably obtained by calculation.

Next, the CPU 100 obtains the number of sheets which can be present from the no-sheet detection sensors 41B, 42B, 43B and 44B of the sheet feeding sections 41, 42, 43 and 44 to the secondary transfer position (Step S2). The number of sheets N and the number of images M may be obtained by simultaneous calculations or directly obtained from the table. Conveyance control for aligning the sheet interval between the sheet feeding section and the secondary transfer position is sometimes performed, and in this case the calculations become complex and thus it is preferable to create a table in advance. The number of sheets N corresponding to the sheet feeding sections 41, 42, 43 and 44 is Na, Nb, Nc and Nd respectively.

Next, the CPU 100 determines whether the sheet that is set in the sheet feeding tray 41A of the sheet feeding section 41 for which the distance to the secondary transfer position is the shortest is A4 (Step S3).

If a determination is made that the sheet that is set in the sheet feeding tray 41A is A4 (Yes in Step S3), the CPU 100 determines whether M<Na (Step S4).

If a determination is made that the sheet that is set in the sheet feeding tray 41A is not A4 (No in Step S3), the CPU 100 proceeds to Step S6.

In Step S4, if a determination is made that M<Na (Yes in Step S4), the CPU 100 selects the sheet feeding section 41 (Step S5).

In Step S4, if a determination is made that M<Na is not true (No in Step S4), the CPU 100 proceeds to Step S6.

In Step S6, the CPU 100 determines whether the sheet that is set in the sheet feeding tray 42A of the sheet feeding section 42 for which the distance to the secondary transfer position is the next shortest is A4.

If a determination is made that the sheet that is set in the sheet feeding tray 42A is A4 (Yes in Step S6), the CPU 100 determines whether M<Nb (Step S7).

If a determination is made that the sheet that is set in the sheet feeding tray 42A is not A4 (No in Step S6), the CPU 100 proceeds to Step S9.

In Step S7, if a determination is made that M<Nb (Yes in Step S7), the CPU 100 selects the sheet feeding section 42 (Step S8).

In Step S7, if a determination is made that M<Nb is not true, (No in Step S7), the CPU 100 proceeds to Step S9.

In Step S9, the CPU 100 determines whether the sheet that is set in the sheet feeding tray 43A of the sheet feeding section 43 for which the distance to the secondary transfer position is the next-to-next shortest is A4.

If a determination is made that the sheet that is set in the sheet feeding tray 43A is A4 (Yes in Step S9), the CPU 100 determines whether M<Nc (Step S10).

If a determination is made that the sheet that is set in the sheet feeding tray 43A is not A4 (No in Step S9), the CPU 100 proceeds to Step S12.

In Step S10, if a determination is made that M<Nc (Yes in Step S10), the CPU 100 selects the sheet feeding section 43 (Step S11).

In Step S10, if a determination is made that M<Nc is not true, (No in Step S10), the CPU 100 proceeds to Step S12.

In Step S12, the CPU 100 determines whether the sheet that is set in the sheet feeding tray 44A of the sheet feeding section 44 for which the distance to the secondary transfer position is the next-to-next-to-next shortest (longest) is A4.

If a determination is made that the sheet that is set in the sheet feeding tray 44A is A4 (Yes in Step S12), the CPU 100 determines whether M<Nd (Step S13).

If a determination is made that the sheet that is set in the sheet feeding tray 44A is not A4 (No in Step S12), the CPU 100 proceeds to Step S15.

In Step S13, if a determination is made that M<Nd (Yes in Step S13), the CPU 100 selects the sheet feeding section 44 (Step S14).

In Step S13, if a determination is made that M<Nd is not true, (No in Step S13), the CPU 100 proceeds to Step S15. In Step S15, the CPU 100 determines whether the sheet that is set in the sheet feeding tray 41A is A4.

If a determination is made that the sheet that is set in the sheet feeding tray 41A is A4 (Yes in Step S15), the CPU 100 returns to Step S5 and selects sheet feeding section 41.

If a determination is made that the sheet that is set in the sheet feeding tray 41A is not A4 (No in Step S15), the CPU 100 determines whether the sheet that is set in the sheet feeding tray 42A is A4 (Step S16).

If a determination is made that the sheet that is set in the sheet feeding tray 42A is A4 (Yes in Step S16), the CPU 100 returns to Step S8 and selects sheet feeding section 42.

If a determination is made that the sheet that is set in the sheet feeding tray 42A is not A4 (No in Step S16), the CPU 100 determines whether the sheet that is set in the sheet feeding tray 43A is A4 (Step S17).

If a determination is made that the sheet that is set in the sheet feeding tray 43A is A4 (Yes in Step S17), the CPU 100 returns to Step S11 and selects sheet feeding section 43.

If a determination is made that the sheet that is set in the sheet feeding tray 43A is not A4 (No in Step S17), the CPU 100 determines whether the sheet that is set in the sheet feeding tray 44A is A4 (Step S18).

If a determination is made that the sheet that is set in the sheet feeding tray 44A is A4 (Yes in Step S18), the CPU 100 returns to Step S14 and selects sheet feeding section 44.

If a determination is made that the sheet that is set in the sheet feeding tray 44A is not A4 (No in Step S18), the CPU does not select any of the sheet feeding sections (Step S19).

As described above, the image forming apparatus of this embodiment is designed in such a way to select a sheet feeding section that is known to show the presence or absence of image-formed sheets used in writing the image when performing automatic sheet selection, and thus unnecessary image formation can be controlled without reducing productivity.

In this embodiment, the invention is applied to a tandem type full color image forming apparatus which uses an intermediate transfer member, and it may also be applied to a black and white image forming apparatus that does not use an intermediate transfer member.

What is claimed is:

1. An image forming apparatus comprising:

an image carrier;

an image writing section for writing an image on the image carrier based on image data;

a development section for developing the image written by the image writing section;

a transfer section which transfers the image developed by the development section to a sheet at a transfer position;

a plurality of sheet feeding sections each of which includes a sensor for detecting absence of sheet and feeds sheets to the transfer section;

an input section for setting an automatic sheet selection mode that selects one sheet feeding section which stores sheets of a size corresponding to a size of the image from the plurality of sheet feeding sections; and a control section for obtaining a number of images M and a number of sheets N for each sheet feeding section of the plurality of sheet feeding sections, wherein the control section, in the case where the setting for the automatic sheet feeding selection mode is input by the input section, preferentially selects one of the sheet feeding sections which satisfies M<N, where M represents a number of images that can be present in a path from an image writing position at which an image is written on the image carrier by the image writing section to the transfer position and N represents a number of sheets having left a respective sheet feeding section that can be present in a conveyance path of the sheet, the conveyance path extending between the respective sheet feeding section and the transfer position of the transfer section.

2. The image forming apparatus of claim 1, wherein the control section preferentially selects the sheet feeding section for which the distance from the sensor for detecting absence of sheet to the transfer position is the shortest.

3. The image forming apparatus of claim 2, wherein the image forming apparatus comprises a plurality of image forming sections each of which includes the image carrier, the image writing section and the image development section and wherein the transfer section includes an intermediate transfer member to which the images formed by the plurality of image forming sections are primarily transferred and a secondary transfer section which transfers the images, primarily transferred to the intermediate transfer member, to the sheet.

* * * * *